(12) United States Patent
Cook et al.

(10) Patent No.: US 10,973,169 B2
(45) Date of Patent: Apr. 13, 2021

(54) CUTTING ASSEMBLY FOR A PLANT CUTTING MACHINE

(71) Applicant: CNH Industrial America LLC, New Holland, PA (US)

(72) Inventors: Joel Cook, Lititz, PA (US); John Conroy, Ephrata, PA (US)

(73) Assignee: CNH Industrial America LLC, New Holland, PA (US)

( * ) Notice: Subject to any disclaimer, the term of this patent is extended or adjusted under 35 U.S.C. 154(b) by 627 days.

(21) Appl. No.: 15/402,727

(22) Filed: Jan. 10, 2017

(65) Prior Publication Data

US 2018/0192581 A1 Jul. 12, 2018

(51) Int. Cl.
  *A01D 34/30* (2006.01)
  *A01D 34/14* (2006.01)

(52) U.S. Cl.
  CPC ........... *A01D 34/145* (2013.01); *A01D 34/30* (2013.01)

(58) Field of Classification Search
  USPC .......... 56/257, 158, 264, 270, 271, 296–298
  See application file for complete search history.

(56) References Cited

U.S. PATENT DOCUMENTS

| | | | | |
|---|---|---|---|---|
| 1,565,171 A * | 12/1925 | Livesay | ............... | A01D 34/032 29/891 |
| 2,791,085 A * | 5/1957 | Lewis | .................... | A01D 34/30 56/296 |
| 3,108,421 A * | 10/1963 | Leverenz | ............. | A01D 34/135 56/297 |
| 3,213,599 A * | 10/1965 | Fischer | .................. | A01D 34/13 56/15.2 |
| 3,418,795 A * | 12/1968 | Johnston | ............... | A01D 34/13 56/1 |
| 3,546,864 A * | 12/1970 | White | ................. | A01D 34/305 56/12.6 |
| 4,078,437 A | 3/1978 | Hill | | |
| 4,091,602 A * | 5/1978 | Williams | ............... | A01D 34/30 56/14.4 |
| 4,198,803 A * | 4/1980 | Quick | .................... | A01D 34/13 56/296 |
| 6,216,429 B1 * | 4/2001 | McCredie | ............. | A01D 34/32 56/287 |
| 7,121,074 B1 * | 10/2006 | Regier | ................. | A01D 34/305 56/296 |
| 8,151,547 B2 | 4/2012 | Bich et al. | | |
| 8,282,287 B2 * | 10/2012 | Martinez | ................ | A01D 34/33 384/495 |
| 8,347,594 B1 | 1/2013 | Lovett et al. | | |

(Continued)

*Primary Examiner* — Thomas B Will
*Assistant Examiner* — Mai T Nguyen
(74) *Attorney, Agent, or Firm* — Peter Zacharias; Patrick Sheldrake (57) ABSTRACT

A cutting assembly comprising a drive arm assembly and knife head assembly for a header of a plant-cutting machine is disclosed. The drive arm assembly generally includes a drive unit connected to a pivotable drive member and a bearing element with a rounded head. The knife head assembly generally includes a mounting bar and a clamping portion that collectively form a cavity for receiving the bearing element and forming a pivot joint. The knife head assembly is attached to a cutter bar such that the operation of the drive unit causes the cutter bar to have substantially linear motion by way of the pivot joint.

18 Claims, 9 Drawing Sheets

(56) References Cited

U.S. PATENT DOCUMENTS

| | | | |
|---|---|---|---|
| 2007/0209345 A1 | 9/2007 | Schumacher et al. | |
| 2011/0099964 A1 | 5/2011 | Coers et al. | |
| 2014/0190139 A1* | 7/2014 | Cook .................. | A01D 34/145 56/10.1 |
| 2015/0163994 A1* | 6/2015 | Bich ..................... | A01D 34/14 56/299 |
| 2016/0073586 A1 | 3/2016 | Biggerstaff | |

* cited by examiner

CUTTING ASSEMBLY FOR A PLANT CUTTING MACHINE

FIELD OF THE INVENTION

The present invention relates generally to a cutting assembly for a header of a plant cutting machine (e.g., a combine harvester) and, more specifically, to a cutting assembly suitable for mounting proximate to a header using a pivot joint.

BACKGROUND OF THE INVENTION

Cutting assemblies of large headers of plant cutting machines are typically driven either from near the center of the header or from an end of the header by an oscillating drive. Both a center driven and a side driven header have advantages and disadvantages over the other.

In the case of a side driven header, i.e. a header having a driver located in one of the sides of the header, an advantageous aspect is that the driver does not obstruct or interfere with how plants are cut. However, a disadvantageous aspect is that the weight of the oscillating drive is concentrated at the end of the header. Because the weight is distally concentrated, the structure of the header must be reinforced to properly accommodate this stress. Additionally, relatively long drive lines are generally required to establish a connection between the oscillating drive and the power source, such as a combine attached to the header, the connections of which are more proximate to the center of the header.

While a center driven header may rectify some of the disadvantages of a side driven header such as the weight distribution, a more prevalent problem presents itself. Specifically, the use of a center driven header typically requires an assembly extending up above and connected to the cutter assemblies. Consequently, the space for collecting cut plants must also rise which creates inefficiencies, increases the moment of forces and waste.

Additionally, a problem that exists between both a side driven and a center driven header is the connecting mechanism between the cutter assembly and the driver. As a plant cutting machine is operated, it travels over great distances on non-planar ground. Therefore, the connecting mechanism should preferably be able to accommodate the shift in ground level as the plant-cutting machine is operated, however, a rigid construction creates unnecessary stress on the assembly, thereby reducing its life expectancy and efficiency.

Accordingly, what is sought is a cutting assembly that is efficiently removable and is compatible with a drive mounted proximate the center of the header and that increases efficiency with space claims above the cutter assembly. When the disclosed invention is used in combination with such a drive, the invention overcomes one or more of the disadvantages referenced above by providing more flexibility with space issues and connections at the cutter assembly to driver connection.

BRIEF SUMMARY OF THE INVENTION

The present invention provides a cutting assembly capable of translating substantially straight line motion to a knife head that can be located either central to or at a side of a header's cutter bar assembly.

In accordance with a first exemplary embodiment of the present invention, there is provided a header for a plant cutting machine that comprises a drive arm assembly and a knife head assembly. The drive arm assembly includes a drive member having a proximal end configured for attachment to a drive unit for reciprocating motion therewith and a distal end opposite the proximal end. The drive arm assembly further includes a bearing element having a rounded head that is connectable to the distal end of the drive member. The knife head assembly includes a mounting bar and a clamping portion connectable to the mounting bar. The mounting bar and clamping portion collectively forming a cavity for receiving the rounded head of the bearing element.

An aspect of the first exemplary embodiment of the present invention is that the reciprocating motion of the drive arm assembly drives substantially linear motion of the knife head assembly along a direction that is substantially parallel to a longitudinal length of the mounting bar. Another aspect of the first exemplary embodiment is that the rounded head is mounted within the cavity defining a pivot joint. In an alternate aspect, the bearing element includes a bearing surrounding the rounded head. Another aspect of the bearing element is that it includes a shaft that extends from the rounded head and which is connected to the drive member. Additionally, the shaft is integrally formed with the rounded head.

An aspect of the knife head assembly is that the clamping portion and mounting bar define an opening that substantially faces the distal end of the drive member and is in communication with the cavity for receiving the bearing element. It is preferred that the opening faces a direction that is substantially perpendicular to a longitudinal length of the mounting bar and substantially parallel to an upper surface of the mounting bar. In an alternative aspect, the bearing element is integrally formed with the clamping portion.

Another aspect of the knife head assembly is that the clamping portion includes an inner concave bearing for engaging the rounded head. The mounting bar also includes a concave portion for receiving the rounded head. Additionally, the clamping portion further includes a seal between the bearing element and the clamping portion.

In accordance with a second exemplary embodiment of the present invention, there is provided a drive arm assembly for a plant cutting machine that comprises a drive member and a bearing element. The drive member includes a proximal end configured for attachment to a drive unit for reciprocating motion therewith and a distal end opposite the proximal end. The bearing element includes a rounded head for connecting to a knife head assembly and a shaft extending from the rounded head that is connectable to the distal end of the drive member.

An aspect of the second exemplary embodiment is that it further comprises a seal that circumscribes the bearing element. Additionally, the shaft is integrally formed with the rounded head. The bearing element may further include a bearing surrounding the rounded head.

In accordance with a third exemplary embodiment of the present invention, there is a provided a knife head assembly for a plant cutting machine comprising a mounting bar and a clamping portion connectable to the mounting bar. The mounting bar and clamping portion collectively form a cavity for receiving a bearing element of a drive arm assembly.

An aspect of the third exemplary embodiment is that the clamping portion can include an inner concave bearing. Additionally, the mounting bar can also include a concave portion for receiving the inner concave bearing. Another aspect of the third exemplary embodiment is that the clamping portion and mounting bar define an opening in communication with the cavity for receiving the bearing element, wherein the opening faces a direction substantially transverse to a longitudinal length of the mounting bar.

Other features and advantages of the present invention will be apparent from the following more detail description of the exemplary embodiment, taken in conjunction with the accompanying drawings which illustrate, by way of example, the principles of the invention.

BRIEF DESCRIPTION OF THE SEVERAL VIEWS OF THE DRAWINGS

The foregoing summary, as well as the following detailed description of the exemplary embodiments of the invention, will be better understood when read in conjunction with the appended drawings. For the purpose of illustrating the invention, there are shown in the drawings exemplary embodiments. It should be understood, however, that the invention is not limited to the precise arrangements and instrumentalities shown.

DETAILED DESCRIPTION OF THE INVENTION

Reference will now be made in detail to the various embodiments of the present invention illustrated in the accompanying drawings. Wherever possible, the same or like reference numbers will be used throughout the drawings to refer to the same or like features. It should be noted that the drawings are in simplified form and are not drawn to precise scale. Certain terminology is used in the following description for convenience only and is not limiting. Directional terms such as top, bottom, left, right, above, below and diagonal, are used with respect to the accompanying drawings. The term "distal" shall mean away from the center of a body. The term "proximal" shall mean closer towards the center of a body and/or away from the "distal" end. The words "inwardly" and "outwardly" refer to directions toward and away from, respectively, the geometric center of the identified element and designated parts thereof. Such directional terms used in conjunction with the following description of the drawings should not be construed to limit the scope of the present invention in any manner not explicitly set forth. Additionally, the term "a," as used in the specification, means "at least one." The terminology includes the words above specifically mentioned, derivatives thereof, and words of similar import.

The terms "grain," "ear," "stalk," "leaf," and "crop material" are used throughout the specification for convenience and it should be understood that these terms are not intended to be limiting. Thus, "grain" refers to that part of a crop which is harvested and separated from discardable portions of the crop material. The header of the present invention is applicable to a variety of crops, including but not limited to wheat, soybeans and small grains. The terms "debris," "material other than grain," and the like are used interchangeably.

"About" as used herein when referring to a measurable value such as an amount, a temporal duration, and the like, is meant to encompass variations of ±20%, ±10%, ±5%, ±1%, or ±0.1% from the specified value, as such variations are appropriate.

Throughout this disclosure, various aspects of the present invention can be presented in a range format. It should be understood that the description in range format is merely for convenience and brevity and should not be construed as an inflexible limitation on the scope of the present invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 2.7, 3, 4, 5, 5.3, and 6. This applies regardless of the breadth of the range.

Furthermore, the described features, advantages and characteristics of the exemplary embodiments of the present invention may be combined in any suitable manner in one or more embodiments. One skilled in the relevant art will recognize, in light of the description herein, that the present invention can be practiced without one or more of the specific features or advantages of a particular exemplary embodiment. In other instances, additional features and advantages may be recognized in certain embodiments that may not be present in all exemplary embodiments of the present invention.

Referring now to the drawings, wherein aspects of the subject application are shown, FIGS. 1-13B illustrate an agricultural harvester 100 in accordance with an exemplary embodiment of the present invention. For exemplary purposes only, the agricultural harvester is illustrated as a combine harvester. The harvester 100 includes a header 102 having a first cutting assembly 200A and a second cutting assembly 200B. The first and second cutting assemblies 200A, 200B are essentially identical, and therefore details hereto will be provided only as to one the first cutting assembly 200A (hereto referred as "cutting assembly 200A"). However, it is understood that the first and second cutting assemblies 200A, 200B need not be identical and that the second cutting assembly 200B can be arranged in ways commonly known in the art.

The cutting assembly 200A includes a drive arm assembly 900, a knife head assembly 1000, a first cutter bar 202A and a drive unit 400. The drive arm assembly 900 includes a drive member 500 and a bearing element 600. The drive member 500 has a proximal end 502 configured for attachment to the drive unit 400 for reciprocating motion therewith and a distal end 504 opposite the proximal end 502. The bearing element 600 includes a rounded head 602 and is connectable to the distal end 504 of the drive member 500. The knife head assembly 1000 includes a mounting bar 700 and a clamping portion 800. The clamping portion 800 is connectable to the mounting bar 700 such that they collectively form a cavity 1002 for receiving the rounded head 602 of the bearing element 600.

Figure 1:
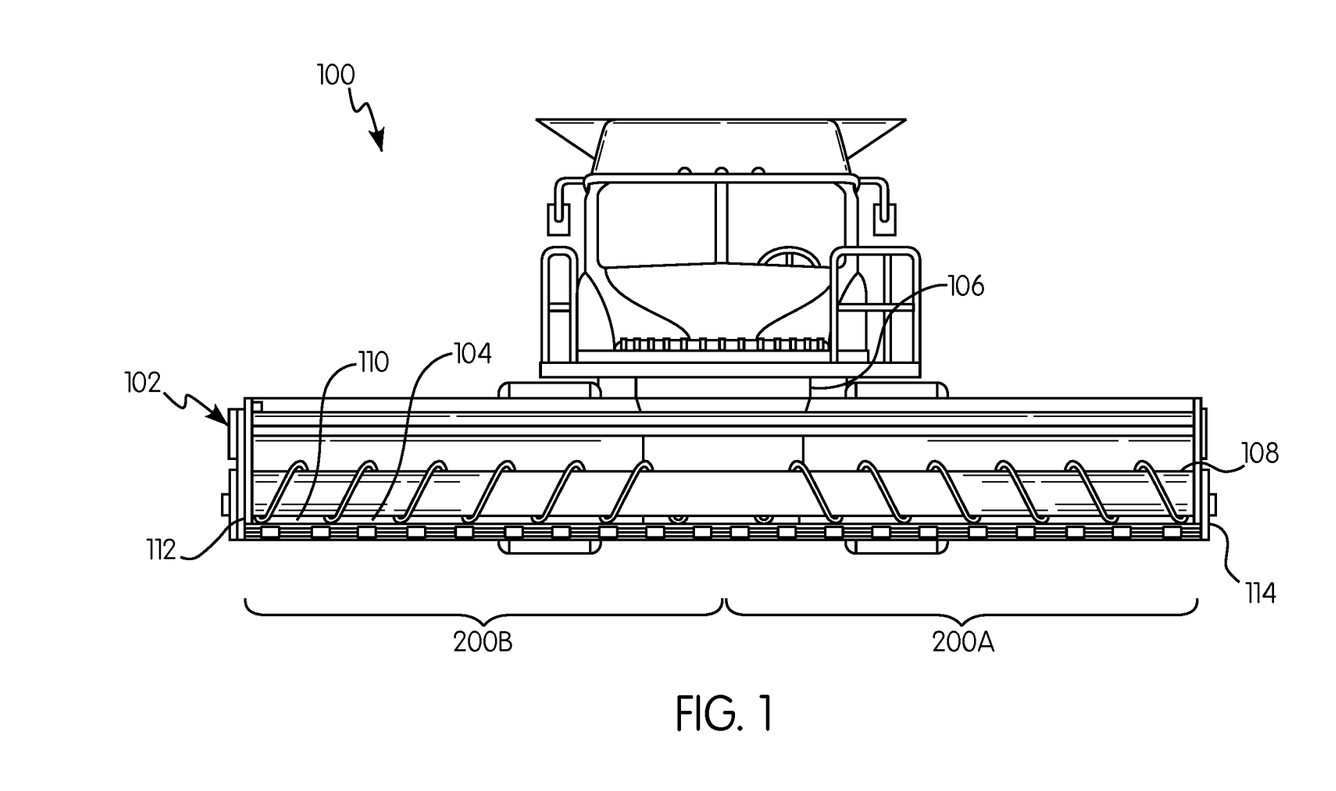
FIG. 1 is a front elevation view of an agricultural harvester including a header in accordance with an exemplary embodiment of the present invention.
Figure 2:
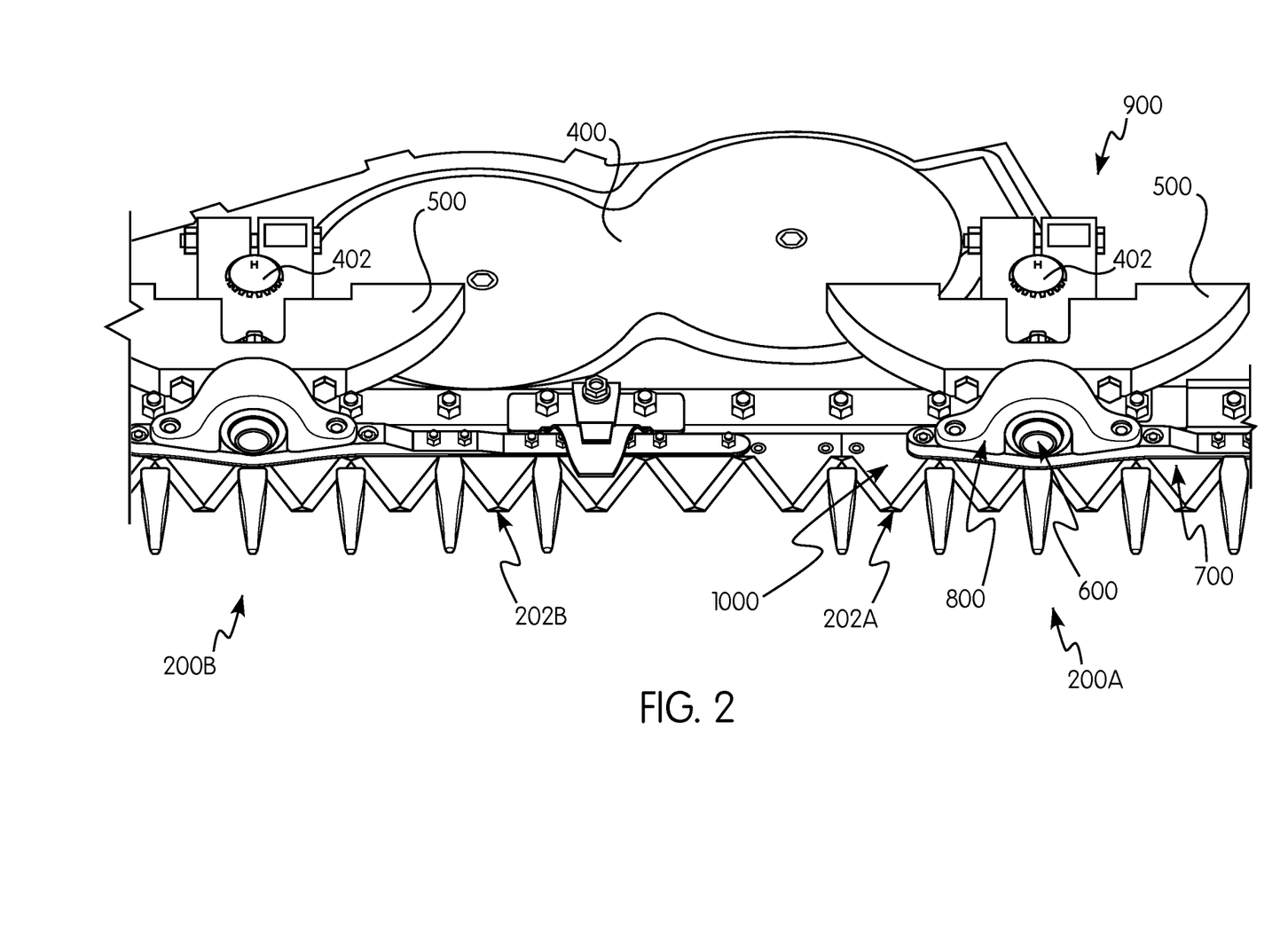
FIG. 2 is a partial perspective view of cutting assemblies of the agricultural harvester of FIG. 1 in accordance with an exemplary embodiment of the present invention.

Referring now to FIGS. 1 and 2, the header 102 is attached to a forward end of the harvester 100, which is configured to cut crops, including (without limitation) small grains (e.g., wheat, soybeans, grain, etc.), and to induct the cut crops into a feederhouse 106 as the harvester moves forward over a crop field.

The header 102 includes a floor 104 that is supported in desired proximity to the surface of a crop field and the first and second cutting assemblies 200A, 200B that extend transversely along a forward edge of the floor 104 i.e., in a widthwise direction of the harvester. The first and second cutting assemblies 200A, 200B are configured to cut crops in preparation for induction into the feederhouse 106. Additionally, the header 102 can include, for example, an elongate, transversely extending harvesting reel 108 disposed above the first and second cutting assemblies 200A, 200B. The harvesting reel 108 is rotatable in a direction suitable for facilitating the induction of cut crops into the feederhouse 106. The header 102 can further include an elongate, rotatable auger which extends in close proximity to the first and second cutting assemblies 200A, 200B. The auger is configured to cooperate with the harvesting reel 108 in conveying cut crops to the feederhouse 106, which is configured to convey the cut crops into the harvester 102 for threshing and cleaning. While the foregoing aspects of the harvester are being described with respect to the header shown, the cutting assembly of the subject application can be applied to any other header having use for such a cutting assembly.

The cutting assemblies 200A, 200B extend along a forward edge 110 of the floor 104, and are generally bounded by a first side edge 112 and an opposing second side edge 114, both adjacent to the floor 104. The cutting assemblies 200A, 200B include the first cutter bar 202A and the second cutter bar 202B, respectfully. The first and second cutter bars 202A, 202B are movable and engage in reciprocating motion. The mechanisms of such cutter bars are known in the art and a typical cutter bar applicable to the present exemplary embodiment is disclosed in U.S. Pat. No. 8,151,547, the entire disclosure of which is incorporated by reference herein for all purposes.

Figure 4:
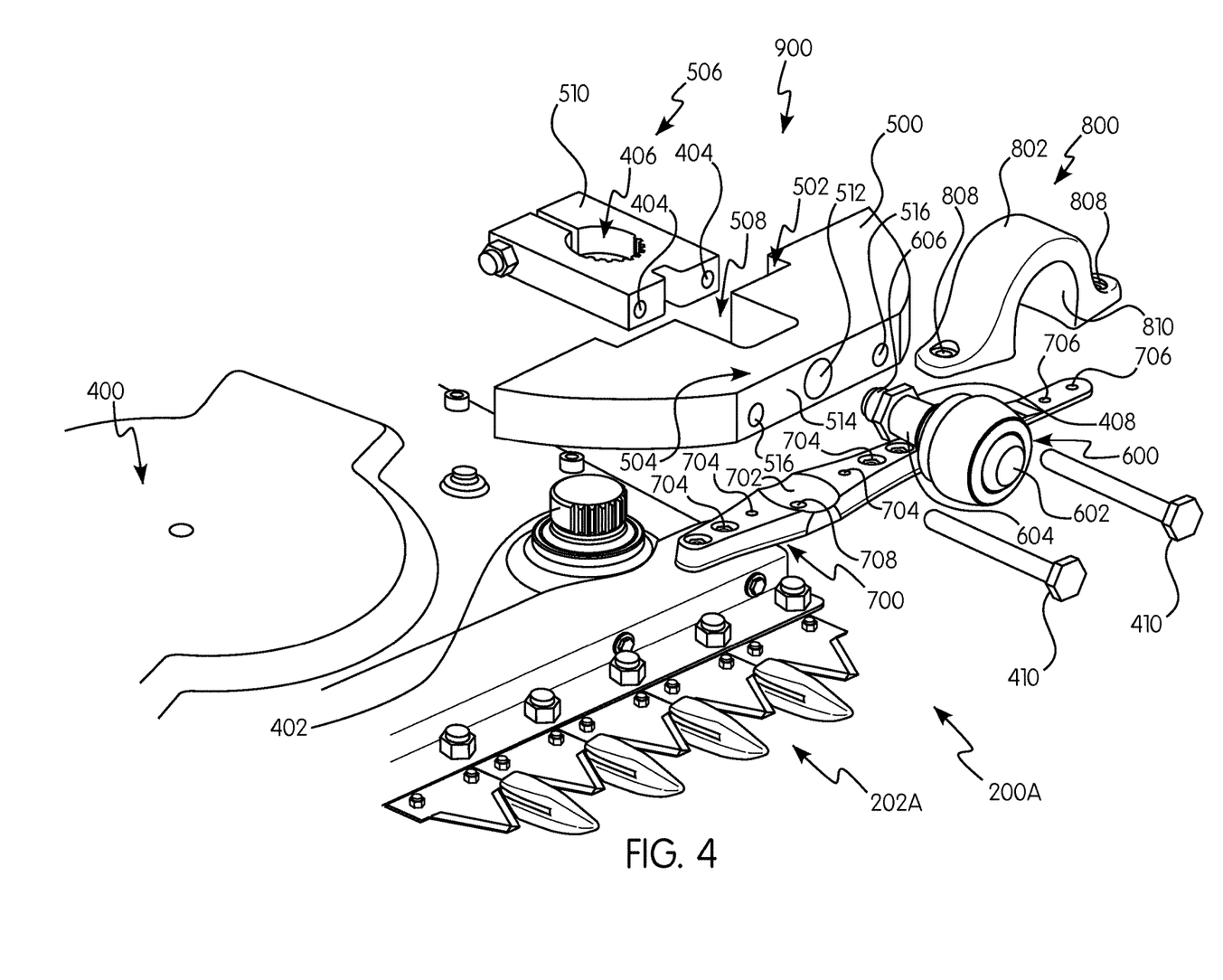
FIG. 4 is a exploded perspective view of the cutting assembly of FIG. 2.

Referring now to FIG. 4, the drive unit 400 includes a motor, such as an electric or hydraulically driven motor, to drive rotation of an output shaft 402 extending outwardly from the drive unit 400. The output shaft 402 is configured as shown in FIG. 4. Preferably, the output shaft 402 is cylindrical in shape and has ridges and channels circumscribing the output shaft 402. It is appreciated by those skilled in the art, however, that the output shaft 402 can take different shapes such as rectangular prisms. The mechanisms of such drive units are known in the art and a typical drive unit applicable to the present embodiment is disclosed in U.S. Pub. No. 2016/0073586, the entire disclosure of which is incorporated by reference herein for all purposes.

Referring now to FIGS. 3-5 and 9, the drive member 500 is configured as shown. The drive member 500 has a proximal end 502 configured for attachment to the output shaft 402 by mechanisms well known in the art, one of which is discussed in greater detail below using brackets 506. The drive member 500 additionally has a distal end 504 opposite the proximal end 502. In accordance with an exemplary embodiment, the drive member 500 includes a gap 508 located substantially centrally to the body of the drive member 500 for connection with a connecting bracket 510. In the present embodiment, the drive member 500 has a trapezoidal shape having a shorter side near the distal end 504 and a longer side near the proximal end 502. The sides of the drive member 500 however do not need to be linear and are instead curved. The benefit of having curved sides is that they help conserve space limitations and minimize clearances between the components of the cutting assembly 200A and the header 102.

Figure 5:
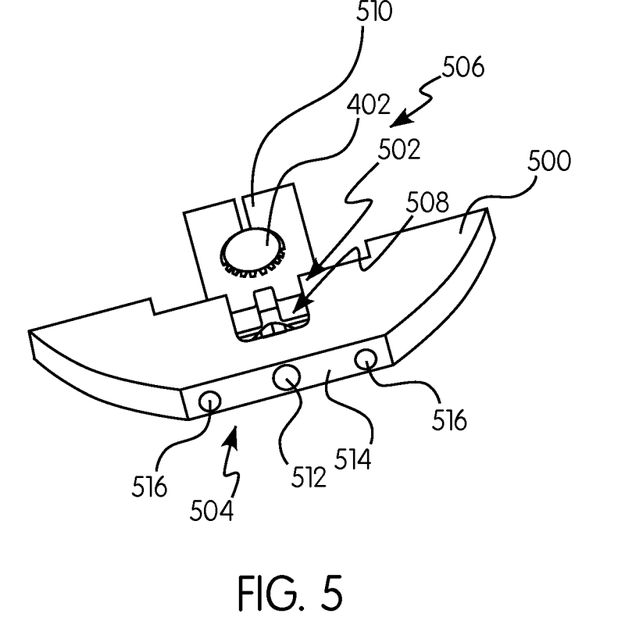
FIG. 5 is a perspective view of a drive member of the drive arm assembly of FIG. 3.

It is appreciated by those skilled in the art that the shape of the drive member 500 may vary and may instead be a different shape, such as a rectangle. Additionally, it is understood that the drive member 500 does not need to be planar and may include grooves or other features for engaging other elements or for the benefit of space claim concerns inside the header 102.

Drive member 500 further includes a through-hole 512 extending from the distal end 504 towards the proximal end 502 in communication with the gap 508. The through-hole 512 extends through a distally facing side 514 of the drive member 500. The drive member 500 also has a pair of through-holes 516 extending from its distal end 504 to the proximal end 502 coinciding with a pair of screw-holes 404 on the connecting bracket 510. In the preferred embodiment, the screw-holes 404 are threaded and the through-holes 516 are clearance holes configured to align with the screw-holes 404 to create a screw connection. It is appreciated, however, that the connection can be configured in any other way known in the art, including, but not limited to, threading the through-holes 516 or making screw-holes 404 clearance-hole.

In the preferred exemplary embodiment, the through-hole 512 has a substantially consistent diameter, however, in an alternate embodiment the through-hole 512 may be tapered such that the through-hole 512 has a smaller diameter closer to the proximal end 502 and a larger diameter closer to the distal end 504. Although the above through-holes 512, 516 are described with reference to diameters, it is understood that they are not limited as such; the through-holes 512, 516 may instead be different shapes such as, for example, squares.

The drive member 500 is configured to attach to one or more brackets 506, such as the connecting bracket 510. The connecting bracket 510 is configured as best shown in FIGS. 4 and 5. Specifically, the connecting bracket 510 has an aperture 406 designed to engage the output shaft 402. One such design could include ridges and channels circumscribing the inner surface of the aperture 406 that interconnect with the ridges and channels that circumscribe the output shaft 402. Additionally, the connecting bracket 510 could have a series of fasteners for engaging other components of the header 102. The connecting bracket 510 also has the screw-holes 404 on its side closest to the drive member 500. In the exemplary embodiment, the screw-holes 404 are threaded for a screw connection.

While the foregoing describes the drive member 500 and the connecting bracket 510 as separate pieces that connect the drive member 500 to the drive unit 400. Alternatively, some or all of the bracketing components may be integrally formed together and/or with the drive member 500 for connecting to the output shaft 402.

Referring now to FIGS. 3, 4, 6 and 9, the bearing element 600 is configured as shown. The bearing element 600 includes a rounded head 602 and a shaft 604 extending therefrom, or vice-versa. The rounded head 602 is designed to fit within a cavity 1002, which is described in further detail below. The shaft 604 may be integrally formed with the rounded head 602 but can alternatively be removably connected by way of a fastener. In the exemplary embodiment, the shaft 604 further has a tapered end 606 designed to fit through the through-hole 512 of the drive member 500. The remainder of the shaft 604 is designed to not fit through the through-hole 512. The tapered end 606 may also include threads such that a nut 408 can be used to secure the bearing element 600 to the drive member 500. Alternatively, the tapered end 606 can include a through-hole 608 disposed to receive a dowel or screw to secure the shaft 604 to the drive member 500.

Figure 6:
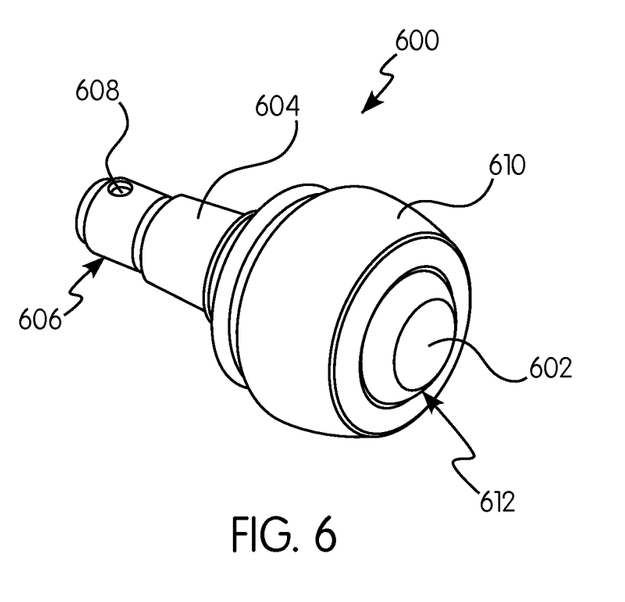
FIG. 6 is a perspective view of a bearing element of the drive arm assembly of FIG. 3.
Figure 7:
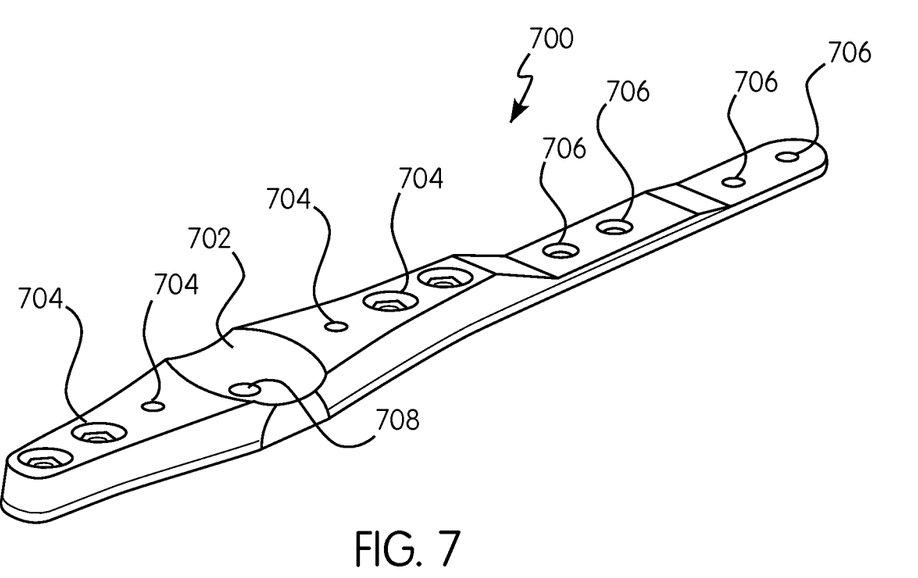
FIG. 7 is a perspective view of a mounting arm of the knife head assembly of FIG. 3.

In the preferred embodiment, the rounded head 602 also includes a bearing or outer layer 610 surrounding the rounded head 602. The bearing 610 may be a round roller bearing circumscribing the rounded head 602. Alternatively, the bearing 610 may instead be a layer of a flexible material, like a polymer such as an elastomer, for absorbing forces on the rounded head 602.

Figure 11:
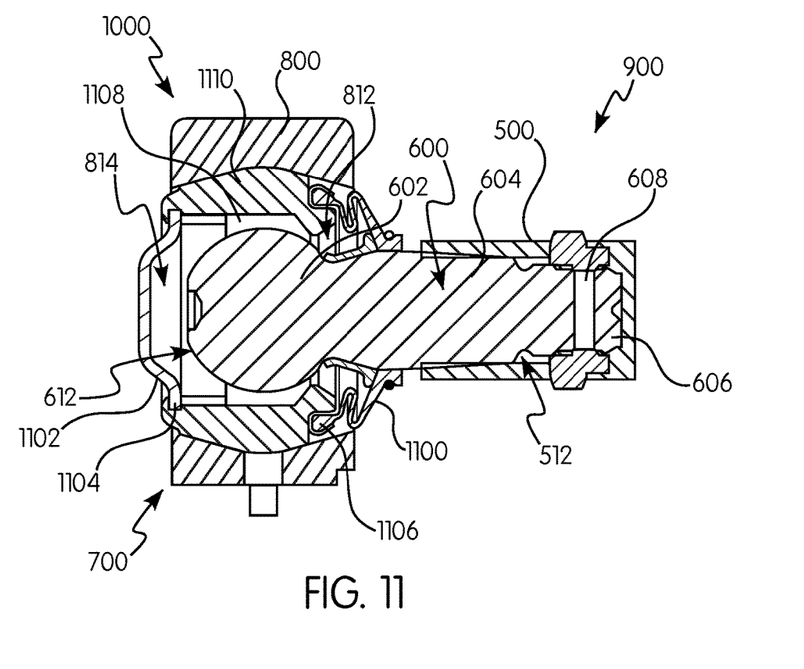
FIG. 11 is a side cross-sectional view of the drive arm assembly and knife head assembly of FIG. 3 taken along lines A-A.

With additional reference now to FIG. 11, the bearing element 600 can also include a seal, or cap, 1100 and/or a seal, or cap, 1102. The seals 1100, 1102 can be made out of metal or a polymer, such as an elastomer. The seal 1100 circumscribes the bearing element 600 and is designed to contact the knife head assembly 1000 in a sealing form to cover any gaps that may exist between the bearing element 600 and the knife head assembly 1000. The seal 1100 is positioned between the bearing element 600 and a clamping portion 800 of the knife head assembly 1000. In other words, the drive arm assembly 900 can further comprise a seal 1100 circumscribing the bearing element 600.

In an exemplary embodiment, the seal 1100 can be an elastomer ring with a hole large enough for the shaft 604 of the bearing element 600 to fit through and slide onto the shaft 604 up to the rounded head 602. In accordance with another exemplary embodiment, the seal 1102 is removably affixed to the rounded head 602 at an end 612 of the bearing element 600. In other words, seal 1102 can act like a cap for covering an opening 814 between the clamping portion 800 and the mounting bar 700.

It is appreciated by those skilled in the art that the bearing 610 and the seals 1100, 1102 may be integrally formed with the design of the bearing element 600. However, it is also appreciated that the bearing 610 and the seals 1100, 1102 can instead be reconfigured to be separate components designed to engage the bearing element 600, mounting bar 700 or clamping portion 800. Alternatively, the bearing 610 and the seals 1100, 1102 can instead be included with the mounting bar 700 and/or clamping portion 800, as described in further detail below.

Referring now to FIGS. 3, 4, 7 and 10 the mounting bar 700 is configured as shown. The mounting bar 700 has a longitudinal length extending parallel to the cutter bar 202A when assembled thereto, a concave portion 702, one or more apertures 704 for receiving fasteners for connecting to a clamping portion 800 and one or more apertures 706 along the longitudinal length of the mounting bar 700 for fastening a cutter bar to the mounting bar 700. Additionally, the concave portion 702 may also include an aperture 708 for further securing the rounded head 602 within the cavity 1002. Alternatively, the aperture 708 may instead be replaced by any other suitable fastener, such as an adhesive surface. The concave portion 702 may additionally include a bearing surface or an otherwise modified surface for engaging the rounded head 602. Additionally, the mounting bar 700 may include features for engaging the seals 1100, 1102 such as grooves 1104 or clasps 1106.

Referring now to FIGS. 3, 4, 8 and 10, the clamping portion 800 is configured as shown. The clamping portion 800 has an outer surface 802 that is arcuate in shape with two ends 804, 806 and apertures 808. The clamping portion 800 further has a concave portion 810 that is also arcuate in shape between the two ends 804, 806 on an inside surface of the clamping portion 800. The concave portion 810 is designed to receive the rounded head 602. The concave portion 810 is further configured to overlap and be in communication with the concave portion 702 of the mounting bar 700. Accordingly, when the clamping portion 800 and mounting bar 700 are secured together, they collectively form the cavity 1002. In other words, the rounded head 602 is mounted within the cavity 1002 defining a pivot joint. Additionally the apertures 808 at the two ends 804, 806 are designed such that they overlap with the aperture 704 of the mounting bar 700.

Figure 8:
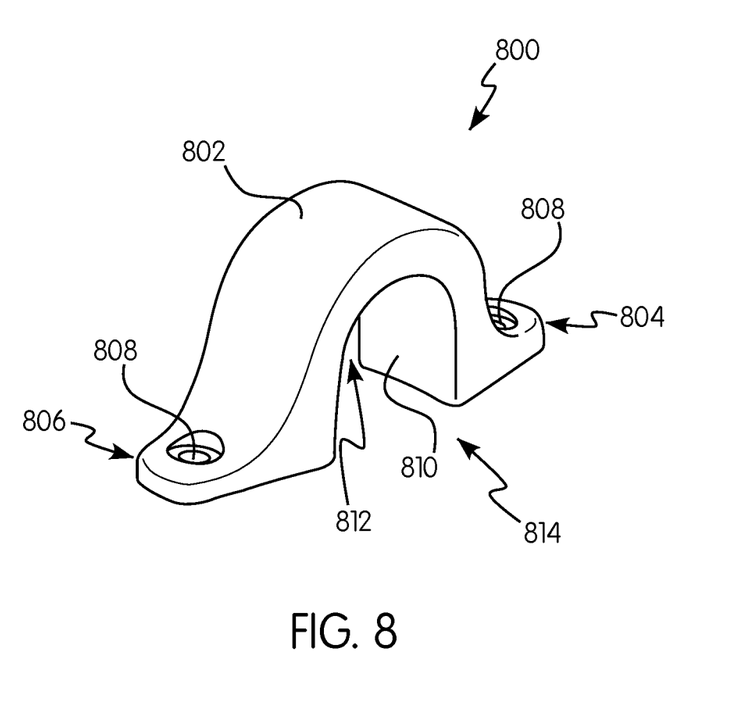
FIG. 8 is a perspective view of a clamping portion of the knife head assembly of FIG. 3.
Figure 9:
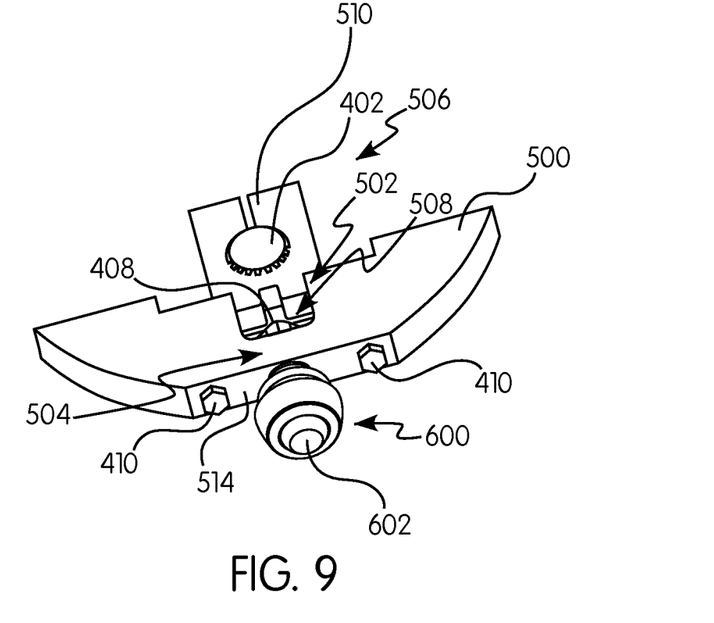
FIG. 9 is a perspective view of the drive arm assembly of FIG. 2.
Figure 10:
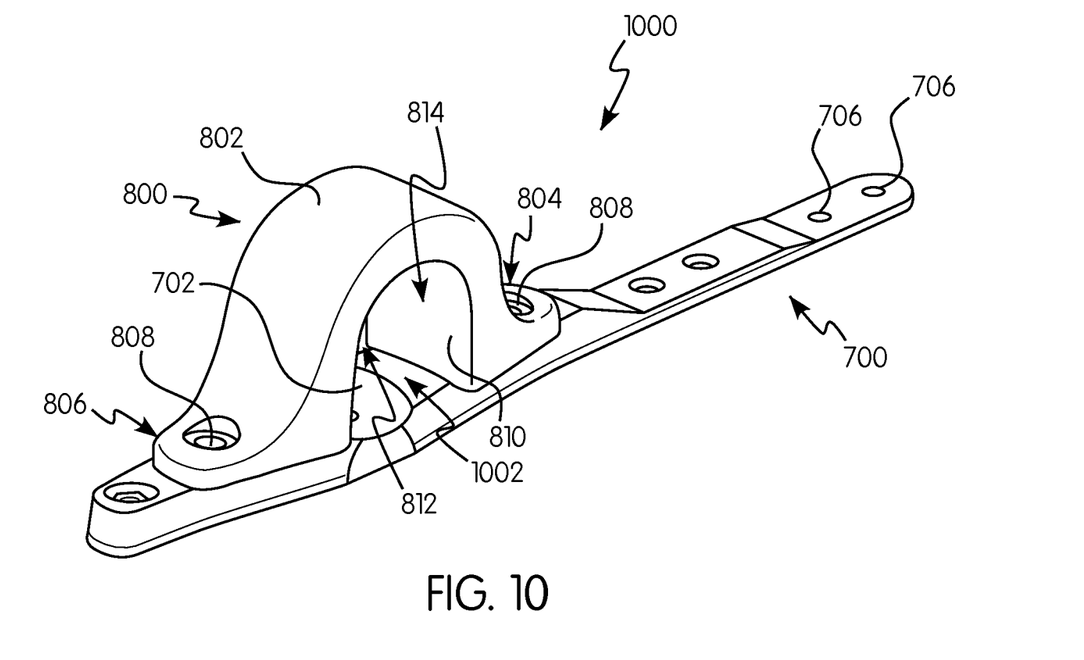
FIG. 10 is a perspective view of the knife head assembly of FIG. 2.

While it is desired that the clamping portion 800 and concave portion 810 be arcuate in shape, the clamping portion 800 may be any other shape suitable with respect to space claims and limitations inside the header 102, such as a square, trapezoid, and so forth. However, it is appreciated that the design of the clamping portion 800 and concave portion 810 is such that it may efficiently be assembled with the mounting bar 700 and bearing element 600 and so that the bearing element 600 is securely held in place inside the cavity 1002.

In accordance with an exemplary embodiment, the apertures 704, 706, 708, 808 are through-holes configured to receive dowels by way of press fit for securing the bearing element 600, the mounting bar 700, the clamping portion 800 and the cutter bar 202A together. However, instead of apertures and dowels alternative mechanisms for connecting two or more elements such as, for example, screws, bolts, rivets, and the like may be used. Additionally, it is appreciated that the apertures 704, 706, 708 do not all have to be incorporated into the present invention and can be omitted if they are unnecessary, such as, for example, the aperture 708.

Figure 3:
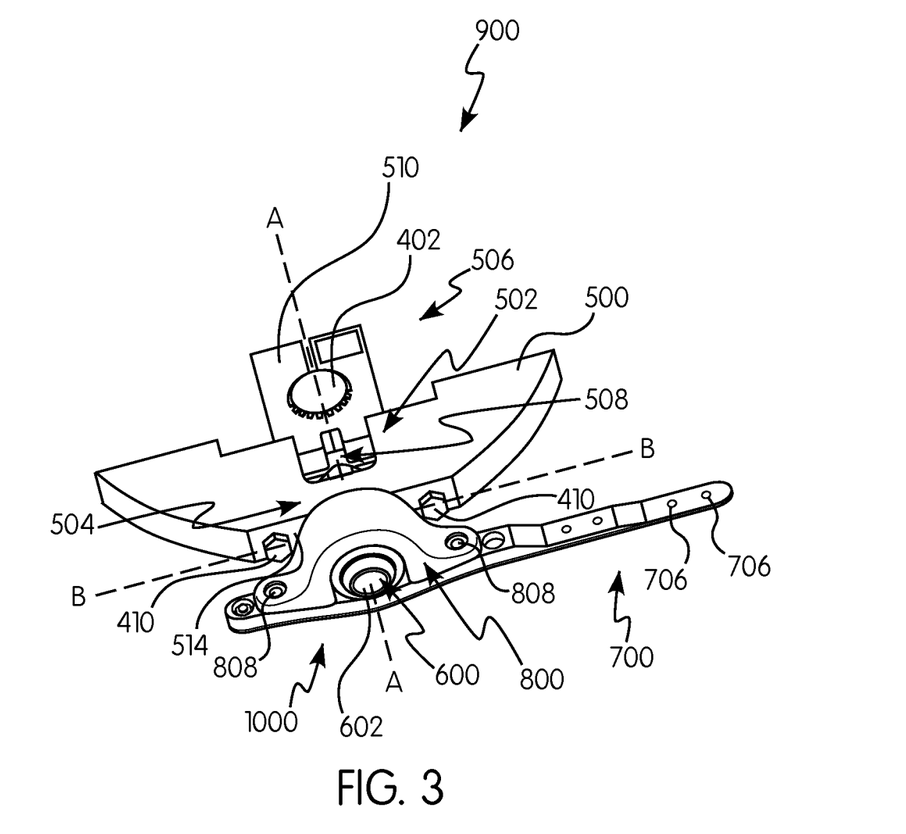
FIG. 3 is a perspective view of a cutting assembly of FIG. 2 with certain parts omitted.

In accordance with an exemplary embodiment, the concave portion 810 forms the opening 812 that faces the drive arm assembly 900 when assembled as shown in FIG. 3. As shown additionally in FIG. 11, the clamping portion 800 has an opening 814 facing away from the knife drive assembly 900 such that the rounded head 602 of the bearing element 600 can partially fit through, as shown in FIGS. 3 and 4. Alternatively, as shown in FIG. 11, the opening 814 may instead be bounded by the seal 1102.

Figure 12:
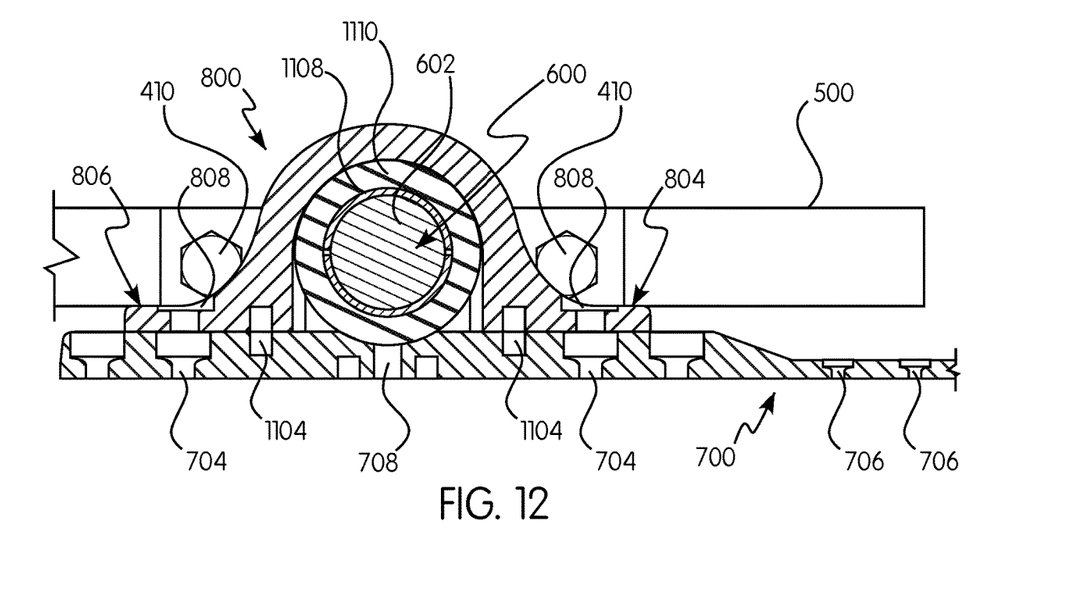
FIG. 12 is a front cross-sectional view of the drive arm assembly and knife head assembly of FIG. 3 taken along lines B-B.

Additionally, as shown in FIGS. 11 and 12, the concave portion 810 may also include an inner concave bearing 1108 for engaging the rounded head 602. The bearing 1108 can be a roller bearing or an intermediate bearing layer. Circumscribing the bearing 1108 can be a bearing surface or housing 1110.

It is appreciated by those skilled in the art that the drive member 500, bearing element 600, mounting bar 700 and clamping portion 800 may be integrally formed with one another, and/or their individual components such as the rounded head 602, in several manners without departing form the scope of the present invention. For example, in one embodiment, the drive member 500 and bearing element 600 are integrally formed; in another embodiment, the bearing element 600 and clamping portion 800 are integrally formed; and in yet another embodiment the clamping portion 800, the rounded head 602 and the mounting bar 700 are integrally formed, and so forth.

With reference now to FIGS. 1-4, 9 and 10, there is illustrated an assembled drive arm assembly 900 and knife head assembly 1000 inside the header 102 in accordance with an exemplary embodiment of the present invention.

The cutting assembly 200A includes a cutter bar 202A connected to the knife head assembly 1000 which is connected to the drive arm assembly 900 driven by the drive unit 400. For convenience purposes only, references will be made only with respect to the first cutting assembly 200A for describing the connections in more detail below, and not the second cutting assembly 200B. It is understood, however, that the second cutting assembly 200B is similarly connected as the first cutting assembly 200A.

With respect to the drive arm assembly 900, the drive unit 400 is operatively connected to the output shaft 402. The output shaft 402 is connected to the drive member 500, by, for example, extending through the aperture 406 of the connecting bracket 510 attached to the drive member 500 and by interconnecting the ridges and channels circumscribing the output shaft 402 and the inner surface of the aperture 406.

In the exemplary embodiment, the bearing element 600 is connected at its shaft 604 to the distal end 504 of the drive member 500. In other words, the bearing element 600 includes a shaft 604 extending from the rounded head 602 and connected to the drive member 500. The connection is made via a through-hole 512 extending through the distal end 504 at its distally facing side 514. It can be appreciated that there are other connection methods available such as, but not limited to, welding or integrally forming the drive member 500 to the bearing element 600. The tapered end 606 extends through through-hole 512 and exits near the proximal end 502 into the gap 508. Because the bearing element 600 has a tapered end 606, the entire longitudinal length of the bearing element 600 cannot fit through the through-hole 512. The bearing element 600 is then fastened at the drive member 500 by means of, for example, a nut and bolt 408 on the tapered end 606 and/or a dowel force-fit into the through-hole 608.

The through-hole 512 is located on a distally facing side 514 of the drive member 500 such that when the bearing element 600 is secured to the drive member 500, the bearing element 600 extends out of the drive member 500 in cantilever relation to the knife head assembly 1000.

With respect to the knife head assembly 1000, the rounded head 602 is positioned over the concave portion 702 of the mounting bar 700. The clamping portion 800 is fastened over the rounded head 602 to the mounting bar 700 such that the two form a cavity 1002 for the rounded head 602 to be secured in. The clamping portion 800 is then secured to the mounting bar 700, e.g., by way of dowels extending through the apertures 704, 808, such as those shown in FIG. 12. Use of dowels provide the ease of assembling and disassembling the knife head assembly 1000. However, it is appreciated by those skilled in the art that the connection may be accomplished in any number of ways including, but not limited to, screws, welding, hooks, clasps, grooves, rivets and receiving holes and so forth.

Referring to FIG. 2, the first cutter bar 202A is attached to the mounting bar 700, e.g., nuts and bolts through the apertures 706. It is to be appreciated that there is no rigid requirement concerning the number of apertures or fasteners. The foregoing exemplary embodiment may be practiced with any number of connection methods and connection points.

It can be thus understood by those skilled in the art that the bearing element 600 extends through the opening 812 between the mounting bar 700 and the clamping portion 800. It is appreciated then that while the cavity 1002 is large enough to receive and cradle the rounded head 602, the opening 812 is smaller than the rounded head 602 but larger than the shaft 604 of the bearing element 600. Consequently, the bearing element 600 is held in place collectively by the clamping portion 800 and mounting bar 700. While the shaft 604 can be integrally formed with the rounded head 602, it can be appreciated that in an alternate embodiment, the shaft can 604 can be a separate piece to be removably attached to the rounded head 602 by way of, for example, a screw and thread connection.

An additional aspect of this exemplary embodiment is that the mounting bar 700 and the clamping portion 800, with the cavity 1002 and the opening 812, securely fasten the bearing element 600 such that the movement of the bearing element 600 is minimized. However, while bearing element 600 is secured, it is permitted marginal, if any, motion between the rounded head 602 and the bearings around it, such as the bearing 610, bearing 1108 and bearing surface 1110 or any combination thereof.

In an exemplary aspect, the clamping portion 800 is mounted to an upper surface of the mounting bar 700 and the bearing element 600 protrudes out of the cavity 1002 in cantilever relation to the drive arm assembly 900 such that the opening 812 faces the drive member 500. In other words, the clamping portion 800 and the mounting bar 700 define an opening 812 facing the distal end 504 of the drive member 500 in communication with the cavity 1002 for receiving the bearing element 600 and the opening 812 faces the a direction substantially perpendicular to a longitudinal length of the mounting bar 700 and substantially parallel to an upper surface of the mounting bar 700. Put differently, the clamping portion 800 and the mounting bar 700 define an opening 812 in communication with the cavity 1002 for receiving the bearing element 600, and the opening 514 faces a direction substantially transverse to a longitudinal length of the mounting bar 700.

Figure 13A:
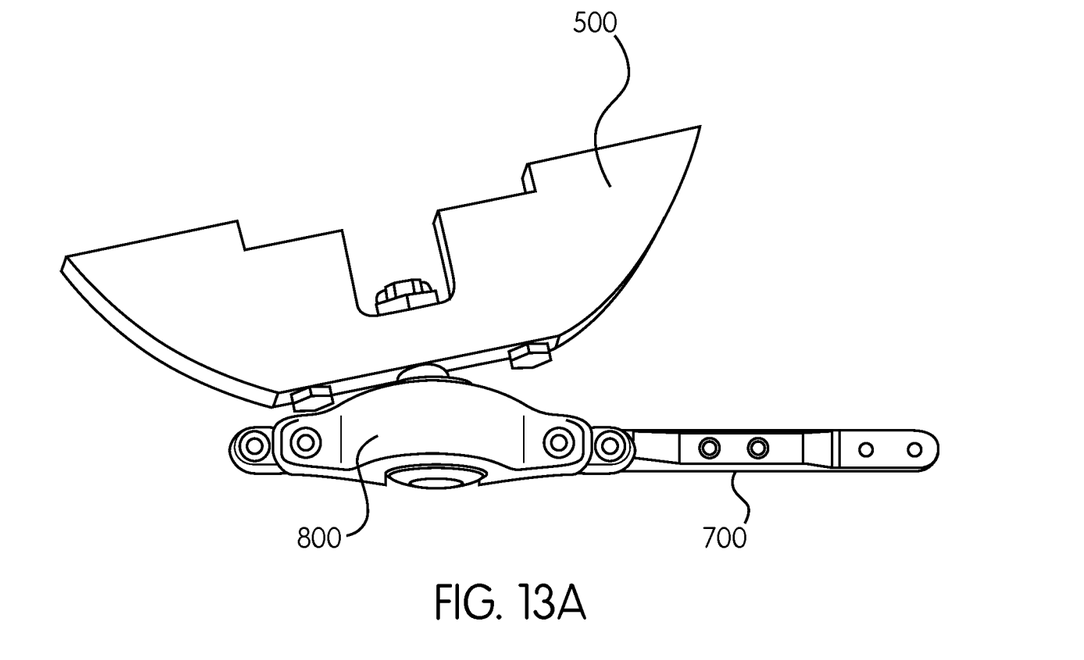
FIG. 13A is a top perspective view of the drive arm assembly and knife head assembly of FIG. 3 in a first operational position.
Figure 13B:
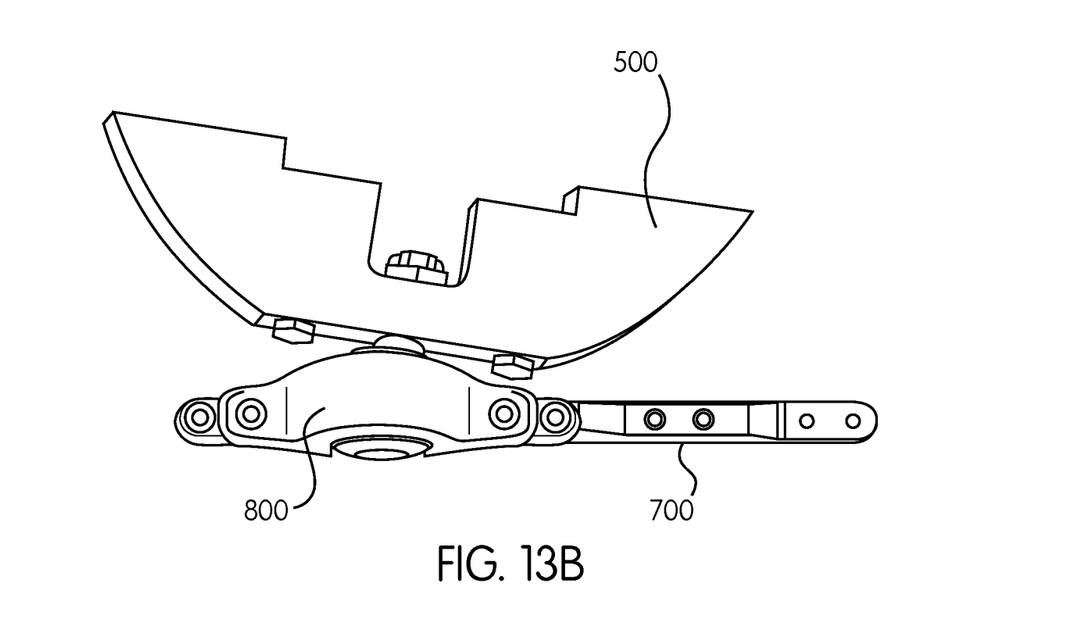
FIG. 13B is a top perspective view of the drive arm assembly and knife head assembly of FIG. 3 in a second operational position.

Referring now to FIGS. 13A and 13B, in the exemplary embodiment, the present invention operates by causing reciprocating motion of the mounting bar 700 and consequently the first cutter bar 202A. As the drive unit 400 is engaged in reciprocating rotational motion, the rotational motion of the drive unit 400 is transferred to the output shaft 402 which begins to rotate in reciprocating fashion. As the output shaft 402 rotates, the connecting bracket 510, which is secured to the output shaft 402, transfers the rotational motion to the drive member 500 and the drive member 500 arcs in a reciprocating longitudinal direction.

As the drive member 500 engages in reciprocating arcing motion, the bearing element 600 that extends in cantilever relation from the drive member 500 arcs with it. Because the bearing element 600 is held by the cavity 1002 in a ball and socket joint like manner, the bearing element 600 pivots within the cavity 1002, or more specifically between the bearings inside the cavity 1002 either around the bearing element 600 or a part of the clamping portion 800 and/or the mounting bar 700. As the bearing element 600 pivots, the bearing element 600 transfers the reciprocating motion to the knife head assembly 1000. Consequently, the knife head assembly 1000 engages in reciprocating linear motion generally in a longitudinal direction.

As shown in FIGS. 13A and 13B, the bearing element 600 pivots while it is inside the cavity 1002. This is accomplished by orientating the opening 812 to face the distal end 504 of the drive member 500 in a horizontal orientation, such that the bearing element 600 connects the drive member 500 to the knife head assembly 1000 in cantilever relation. The bearing element 600 is also oriented above and perpendicular to the mounting bar 700 without extending through the mounting bar 700. Further, the opening 812 faces a direction that is substantially perpendicular to a longitudinal length of the mounting bar 700 and substantially parallel to an upper surface of the mounting bar 700. Therefore, the reciprocating motion of the drive arm assembly 900 drives substantially linear motion of the knife head assembly 1000 along a direction It is appreciated by those skilled in the art that linear motion can be reinforced with the addition of linear bearings on the cutter bar 202A or the mounting bar 700. The benefit of having a pivot joint with varying degrees of freedom is that it is not restricted from accommodating unforeseen and unexpected forces. For example, as an agricultural combine travels over an uneven field, there will be forces pushing up and down against the cutter bar at some spots but not others. A rigid joint would face those forces and fail much quicker than a pivot joint that can accommodate such forces by pivoting in the appropriate direction. Thus, the cutting assemblies 200A will have improved life expectancy and operate more efficiently with less mechanical failure issues than a typical cutter assembly.

Additionally, it can also be appreciated that the present invention is configured such that the assembly tolerances between the various components do not have to be so small as to inhibit construction if the components are not perfectly manufactured. For example, the spherical or arced shape of the rounded head 602 and/or the concave portion 810 of the clamping portion 800, by nature of their spherical shape, can have a significant dimensional variance and still operate as desired.

During reciprocating motion, because forces will be on the bearing element 600, it is likely that the bearing element 600 may fail at some point. Thus, it is desirable that the bearing element 600 be easily replaceable. In the present invention, the cutter bar 202A can be removed from knife head assembly 1000 by releasing the fasteners from the apertures 706. Then the mounting bar 700 and the clamping portion 800 can be separated by removing the dowels from the clamping portion's 800 and mounting bar's 700 respective apertures 808, 708. The bearing element 600 can then be removed from the drive member 500 by releasing the nut 408 and sliding the tapered end 606 out of through-hole 512. Thereafter, the bearing element 600 can be easily replaced and the drive arm assembly 900 and the knife head assembly 1000 can be put back together.

While the present invention has been described with reference to exemplary embodiments, it will be appreciated by those skilled in the art that various changes may be made and equivalents may be substituted for elements thereof without departing from the scope of the present invention. For example, features described in one embodiment may be incorporated into a different embodiment, such as the use of bearings around the bearing element and/or inside the cavity. Additionally, features described in one manner may instead be accomplished by known techniques in the art, such as the methods of making a pivotable connection.

In addition, modifications may be made to adapt a particular situation or material to the teachings of the present invention without departing from the essential scope thereof. For example, the headers and knife drives may only utilize a single cutter blade or two or more cutter blades, or be located centrally to the header or on the side of the header, the bearing element, clamping portion, drive member, and mounting bar may be non-uniformly shaped or be non-planar. It is to be understood, therefore, that the present invention not be limited to the particular aspects disclosed, but it is intended to cover modifications within the spirit and scope of the present invention as defined by the appended claims.

We claim:

1. A header for a plant cutting machine comprising:
    a drive arm assembly including:
        a drive member having:
            a proximal end attached to an output shaft of a drive unit for reciprocating motion therewith,
            a distal end opposite the proximal end, and
        a bearing element having a rounded head, wherein the bearing element is connectable to the distal end of the drive member; and
    a knife head assembly including:
        a mounting bar, and
        a clamping portion connectable to the mounting bar, wherein the mounting bar and clamping portion collectively form a cavity for receiving the rounded head of the bearing element,
        wherein the clamping portion and mounting bar define an opening substantially facing the distal end of the drive member and in communication with the cavity for receiving the bearing element, and
        wherein the opening faces a direction substantially perpendicular to a longitudinal length of the mounting bar and substantially parallel to an upper surface of the mounting bar.

2. The header of claim 1, wherein reciprocating motion of the drive arm assembly drives substantially linear motion of the knife head assembly along a direction substantially parallel to a longitudinal length of the mounting bar.

3. The header of claim 1, wherein the rounded head is mounted within the cavity defining a pivot joint.

4. The header of claim 1, wherein the bearing element further includes a bearing surrounding the rounded head.

5. The header of claim 1, wherein the bearing element further includes a shaft extending from the rounded head and connected to the drive member.

6. The header of claim 5, wherein the shaft is integrally formed with the rounded head.

7. The header of claim 1, wherein the bearing element is integrally formed with the clamping portion.

8. The header of claim 1, wherein the clamping portion includes an inner spherical-like concave bearing for engaging the rounded head.

9. The header of claim 1, wherein the mounting bar includes a concave portion for receiving the rounded head.

10. The header of claim 1, further comprising a seal between the bearing element and the clamping portion.

11. A drive arm assembly for a plant cutting machine, comprising:
    a drive member that includes:
        a proximal end configured for attachment to a drive unit for reciprocating motion therewith, the proximal end comprising a proximal surface, a distal end opposite the proximal end, the distal end comprising a distal surface, and a through hole extending from the distal end to the proximal end through the distal surface and through the proximal surface; and a bearing element that includes:

a rounded head for connecting to a knife head assembly, and a shaft extending from the rounded head entirely through the through hole and directly connected to the distal end of the drive member.

12. The drive arm assembly of claim 11, further comprising a seal circumscribing the bearing element.

13. The drive arm assembly of claim 11, wherein the shaft is integrally formed with the rounded head.

14. The drive arm assembly of claim 11, wherein the bearing element further includes a bearing surrounding the rounded head.

15. A knife head assembly for a plant cutting machine, comprising:

a mounting bar including a concave portion; and a clamping portion connectable to the mounting bar, wherein the concave portion of the mounting bar and clamping portion collectively form a spherical-like cavity for receiving a bearing element of a drive arm assembly.

16. The knife head assembly of claim 15, wherein the clamping portion includes an inner concave bearing.

17. The knife head assembly of claim 16, wherein the concave portion receives the inner concave bearing.

18. The knife head assembly of claim 15, wherein the clamping portion and mounting bar define an opening in communication with the cavity for receiving the bearing element, and wherein the opening faces a direction substantially transverse to a longitudinal length of the mounting bar.

* * * * *